United States Patent [19]

Glamm

[11] Patent Number: 4,528,822
[45] Date of Patent: Jul. 16, 1985

[54] HEAT PUMP REFRIGERATION CIRCUIT WITH LIQUID HEATING CAPABILITY

[75] Inventor: Paul R. Glamm, La Crosse, Wis.

[73] Assignee: American-Standard Inc., New York, N.Y.

[21] Appl. No.: 648,230

[22] Filed: Sep. 7, 1984

[51] Int. Cl.³ .............................................. F25B 27/02
[52] U.S. Cl. .................... 62/238.7; 62/238.6; 62/324.1; 62/324.4
[58] Field of Search ............... 62/238.6, 238.7, 324.1, 62/324.4

[56] References Cited

U.S. PATENT DOCUMENTS

| | | | |
|---|---|---|---|
| 3,916,638 | 11/1975 | Schmidt | 62/238 |
| 3,994,142 | 11/1976 | Kramer | 62/117 |
| 4,134,274 | 1/1979 | Johnsen | 62/179 |
| 4,249,390 | 2/1981 | Jones | 62/238 |
| 4,253,312 | 3/1981 | Smith | 62/238.7 X |
| 4,299,098 | 11/1981 | Derosier | 62/238 |
| 4,356,706 | 11/1982 | Baumgarten | 62/238.6 |
| 4,399,664 | 8/1983 | Derosier | 62/238 |
| 4,409,796 | 10/1983 | Fisher | 62/238.7 X |
| 4,493,193 | 1/1985 | Fisher | 62/238.6 X |

Primary Examiner—Lloyd L. King
Attorney, Agent, or Firm—Ronald M. Anderson; Carl M. Lewis; William J. Beres

[57] ABSTRACT

A heat pump refrigeration circuit utilizes an indoor heat exchange unit, an outdoor heat exchange unit and a refrigerant-liquid heat exchange unit all connected serially to accomplish space heating, space cooling, liquid heating or simultaneous space cooling and liquid heating. A refrigerant charge reservoir is selectively incorporated into the circuit to control the refrigerant charge in the two liquid heating modes of operation by removing excess liquid refrigerant from the circuit. In the two non-liquid heating modes of operation the reservoir is isolated from all but the suction port of the compressor within the circuit. Liquid refrigerant previously deposited in the reservoir during a liquid heating mode of operation is vaporized and returned to the circuit for use in the selected non-liquid heating mode of operation. Refrigerant charge control is thereby maintained in all modes of operation without the necessity of evacuating an inactive heat exchanger.

18 Claims, 7 Drawing Figures

HEAT PUMP REFRIGERATION CIRCUIT WITH LIQUID HEATING CAPABILITY

BACKGROUND OF THE INVENTION

1. Field Of The Invention

The present invention relates generally to the art of refrigeration. More particularly, this invention is directed to the use of a basic heat pump refrigeration circuit to additionally accomplish the heating of a liquid. With still more particularity, my invention is directed to a highly flexible refrigeration circuit operable in at least four modes which provides for the cooling of a space or the heating of a space or the heating of a liquid or for the simultaneous cooling of a space and heating of a liquid. Finally, this invention relates to a refrigeration circuit operable in multiple modes in which refrigerant charge control problems commonly associated with such circuits are alleviated by the selective incorporation of a refrigerant charge reservoir into the circuit when the circuit is called upon to heat the liquid.

2. Background Art

Commonly available devices known as heat pumps are reversible refrigeration systems capable of conditioning a space by heating or cooling the air within the space. The use of heat pump systems to additionally provide for the heating of a liquid utilizing heat otherwise rejected as waste heat has previously been proposed and the efficiency of so utilizing a heat pump system has been recognized. U.S. Pat. Nos. 3,916,638 and 4,249,390 both disclose basic heat pump systems modified to provide domestic hot water heating in addition to space conditioning. The former discloses a multi-mode water-to-air heat pump refrigeration circuit in which the water heating heat exchanger is bypassed when the system is in a space heating mode. The latter discloses a water-to-air heat pump refrigeration circuit in which the system compressor discharges directly to the heat exchanger utilized to heat water. The latter suggests that under certain conditions water may be heated while a space is being heated and also contemplates some system for controlling the amount of water circulated from the water source which acts as a heat sink.

Refrigerant charge control problems within such systems are significant, well recognized and cannot be ignored. U.S. Pat. No. 3,994,142 is directed at a solution for refrigerant charge control problems in a refrigeration circuit in which at least one heat exchanger is operated only intermittently. The solution contemplates flooding the intermittently operated heat exchanger with liquid refrigerant to avoid the problems associated with attempting to evacuate and isolate that heat exchanger. Refrigerant charge control problems are likewise noted in U.S. Pat. No. 4,299,098, a patent assigned to the assignee of the invention herein disclosed. Refrigerant charge control is accomplished in the latter patented circuit by venting the inactive heat exchanger to the suction port of the system compressor in order to evacuate the inactive heat exchanger and provide refrigerant charge control within the system.

A multi-mode refrigeration circuit is needed which is simpler yet equally flexible and effective as previous circuits in order to make practical the use of the readily available waste heat in heat pump systems to heat liquids such as water for domestic purposes.

SUMMARY OF THE INVENTION

The present invention is a refrigeration circuit operable in the four previously mentioned independent modes of space heating, space cooling, liquid heating, or simultaneous space cooling and liquid heating. The circuit is particularly suited to provide residential heating, cooling and water heating in an efficient and economical fashion. A minimum number of relatively inexpensive and commonly available components are utilized to effect the modal operation of the system. Most importantly, no necessity exists to evacuate and maintain evacuated an inactive heat exchanger within the circuit. The refrigerant-liquid heat exchanger in the circuit by which liquid is heated is a condenser as opposed to the de-superheating only water heaters utilized in some systems. This circuit therefore has a higher water heating capacity than systems utilizing de-superheating only water heaters.

The circuit includes conduit means, means for metering refrigerant flow within the circuit, a compressor, an outdoor heat exchange unit, an indoor heat exchange unit and a refrigerant-liquid heat exchange unit all connected in a serial fashion. In order to maintain refrigerant charge control within the circuit a refrigerant charge reservoir is disposed fo receive refrigerant in its liquid state which is excess to the circuit when the circuit is heating a liquid. At all other times, the charge reservoir is vented to the suction side of the compressor making any refrigerant contained therein available to the system for use. As will become more apparent, refrigerant which is excess to the system in the water heating modes of operation is not excess to the system in the non-water heating modes of operation. Conduit sections and selectively positionable valves are provided to direct refrigerant flow within the circuit depending upon the mode of operation.

In the space heating mode of operation refrigerant vapor is directed from the compressor to the indoor heat exchange unit, which is active, where it is condensed and gives up heat to the indoor space. Condensed refrigerant is returned through the inactive liquid heat exchange unit to the outdoor heat exchange unit which is active. The refrigerant is vaporized in the outdoor unit and returned to compressor suction. The refrigerant charge reservoir is isolated from all but the suction port of the compressor in this mode of operation making refrigerant contained therein, if any, available to the circuit for use and insuring that a full refrigerant charge is available to the circuit.

In the space cooling mode of operation refrigerant vapor is directed from the compressor to the active outdoor heat exchange unit where it is condensed and gives up heat to the ambient. Condensed refrigerant is routed through the inactive liquid heat exchange unit to the indoor heat exchange unit which is active. In the indoor heat exchange unit the refrigerant is vaporized, removing heat from the space, and is then returned to compressor suction. Once again the refrigerant charge reservoir is isolated from all but the suction port of the compressor in this mode of operation.

In the liquid heating mode of operation refrigerant vapor is directed from the compressor through the indoor heat exhange unit, which is inactive, to the liquid heat exchange unit which is active. Refrigerant vapor is condensed within the liquid heat exchange unit giving up heat to a liquid being circulated therethrough. The refrigerant is directed out of the liquid heat exchange unit and into the outdoor unit, which is active, where it is vaporized and returned to compressor suction. In the liquid heating mode of operation refrigerant vapor passes through the inactive indoor heat exchange unit unaffected, therefore, no condensed refrigerant will be found to exist in the indoor heat exchange unit in this mode of operation. Further, since condensation is ongoing in the refrigerant-liquid heat exchange unit, the heat exchanger within this unit will not be flooded with liquid refrigerant as it is in the non-liquid heating modes. Consequently, provision must be made to remove liquid refrigerant from the circuit, for refrigerant charge control purposes, which is otherwise accommodated for in the circuit in the non-liquid heating modes of operation. By directing liquid refrigerant which is excess in the liquid heating modes of operation to the refrigerant charge reservoir a proper refrigerant charge is maintained in the circuit in the liquid heating modes of operation. When the mode of circuit operation is changed to a non-liquid heating mode, the refrigerant charge reservoir is connected to compressor suction and refrigerant contained within the reservoir is vaporized and provided to the circuit in order to provide a proper refrigerant charge in the non-liquid heating modes.

In the simultaneous liquid heating and space cooling mode refrigerant vapor is directed from the compressor through the outdoor heat exchange unit, which is inactive, to the liquid heat exchange unit which is active. Refrigerant vapor is condensed within the liquid heat exchange unit by the liquid being circulated through the unit. Condensed refrigerant is then directed to the active indoor heat exchange unit where it is vaporized and returned to compressor suction. As in the liquid heating mode of operation excess liquid refrigerant is directed to the refrigerant charge reservoir to be made available to the circuit for use when a non-liquid heating mode of operation is subsequently selected.

It will thus be appreciated that it is an object of this invention to provide a multi-mode heat pump refrigeration circuit providing for the heating of a space or the cooling of a space or the heating of a liquid or for the simultaneous heating of a liquid and the cooling of a space.

Another object of this invention is to provide a multimode refrigeration circuit which avoids evacuating refrigerant from an inactive heat exchange unit and avoids the problems attendant therewith.

It is a further object of this invention to provide a multimode refrigeration circuit capable of heating a liquid, and which avoids the problems attendant with evacuating an inactive heat exchanger and in which refrigerant charge control is reliably accomplished utilizing a minimum number of components.

Finally, it is an object of this invention to provide a multimode refrigeration circuit including at least two modes in which what would otherwise be waste heat is utilized to heat a liquid, which avoids the problems associated with previos systems and which is both practical and economically viable.

These and other objects and advantages of the present invention will become apparent from the following description of the preferred embodiment and the accompanying drawings.

DESCRIPTION OF THE PREFERRED EMBODIMENT

Referring generally to FIGS. 1 through 4 of the drawing in which identical components are identically numbered, the refrigeration circuit of the present invention is indicated generally by the reference numeral 10. Circuit 10 is capable of heating a space, cooling a space, heating a liquid or simultaneously cooling a space while heating a liquid. Circuit 10 is essentially divisable into three sections each of which contain a heat exchanger and in each of which heat exchange may occur between a medium and the refrigerant passing through that portion of the circuit. Outdoor unit 20, indoor unit 40, and liquid heating module 60 are connected and interact to comprise refrigeration circuit 10. The heat exchanger within a unit, and thus the unit, is said to be activated when the medium with which refrigerant interacts to accomplish the exchange of heat is urged mechanically through the heat exchanger.

Outdoor unit 20 in the preferred embodiment, as is common in many commercially available heat pump systems, is packaged to include a compressor 21, a thermal expansion valve 22, a check valve 23, a heat exchanger 24, a reversing valve 25 and a fan 26. Many, if not all such units, will include a service connection 27 which communicates with the suction port of the compressor within the unit. Compressor 21 includes a discharge port 21a and suction port 21b. Compressor 21 communicates with reversing valve 25 through discharge port 21a and a refrigerant conduit section 80. Reversing valve 25 is a selectively positionable valve providing dual flow paths and having a first port 1, a second port 2, a third port 3 and a fourth port 4. When in a first position a flow path is established between ports 1 and 2 and between ports 3 and 4 within valve 25. In a second position flow paths are established between ports 1 and 4 and between ports 2 and 3 within the valve.

Port 2 of valve 25 is connected via conduit section 81, to refrigerant flow connection 41a of heat exchanger 41 within indoor unit 40. Indoor unit 40, in this embodiment is an air handler of the type commercially available and commonly utilized in heat pump systems. Heat exchanger 41 is connected via flow connection 41b and conduit section 82 to both thermal expansion valve 42 and check valve 43. Conduit section 83 provides a refrigerant flow path from both expansion valve 42 and check valve 43 out of indoor unit 40. Indoor unit 40 includes a blower 44 for circulating air to be conditioned through heat exchanger 41.

After exiting indoor unit 40 conduit section 83 enters liquid heating module 60 and provides a flow path for refrigerant to refrigerant flow connection 61a of refrigerant-liquid heat exchanger 61 which functions as a condenser rather than a de-superheater. Liquid heating module 60 includes a liquid pump 63 which, when running circulates a liquid to be heated through heat exchanger 61. The liquid to be heated is contained in storage tank 100. Tank 100 in the preferred embodiment is a domestic hot water heater of conventional design. When activated, pump 63 pumps liquid out of heat exchanger 61, through liquid flow connection 61c and liquid conduit 110, into liquid conduit 111 and thence to liquid storage tank 100. Liquid is then pumped out of storage tank 100 through liquid conduit section 112 back into heat exchanger 61 through liquid flow connection 61d.

Module 60 includes refrigerant charge reservoir 64, the significance of which has generally been described above and which is more thoroughly explained below. Reservoir 64 is connected to first solenoid operated refrigerant valve 62 via refrigerant conduit section 85 and thence, via conduit section 84 to the refrigerant flow path within heat exchanger 61. Reservoir 64 communicates with a second solenoid operated refrigerant valve 65 through refrigerant conduit section 86. Refrigerant conduit 87 connects refrigerant valve 65 to service connection 27 of outdoor heat exchange unit 20. Refrigerant valves 62 and 65 are single path valves which are either open to provide a flow path or closed to block a flow path. In operation when one of the two valves is opened, the other of the two valves is closed. For control purposes the valves are preferably ganged together for simultaneous operation utilizing a single control signal as is demonstrated in the figures. Though the use of two separate refrigerant valves has been found to be preferable in this circuit, it is evident that valves 62 and 65 could be replaced by a single selectively operated dual path valve such as a reversing valve. If a single valve were to be utilized, refrigerant conduit sections 85 and 86 could be replaced by a single section of conduit connecting reservoir 64 with the single valve.

Refrigerant conduit section 88 provides a flow path between refrigerant flow connection 61b of heat exchanger 61 and outdoor heat exchange unit 20. Conduit section 88 connects heat exchanger 61 with both thermal expansion valve 22 and check valve 23. Thermal expansion valve 22, like thermal expansion valve 42, comprises means for metering refrigerant flow within the circuit. It will be appreciated by those skilled in the refrigeration arts that many other refrigerant metering devices and schemes exist which are equally applicable for use in this circuit. Expansion valve 22 and check valve 23 are connected by refrigerant conduit section 89 to refrigerant flow connection 24a of heat exchanger 24. It is to be noted that refrigerant conduit sections 82, 83, 88 and 89 may contain refrigerant in the liquid state depending upon the mode of circuit operation. These sections along with the refrigerant flow path within refrigerant-liquid heat exchanger 61 can be characterized collectively as the refrigerant liquid line within circuit 10.

Heat exchanger 24 is connected with port 4 of reversing valve 25 by refrigerant conduit section 90 which connects with heat exchanger 24 at refrigerant flow connection 24b. Fan 26, when activated, acts to circulate air through heat exchanger 24 in a heat exchange relationship with refrigerant flowing therethrough. Other mediums besides air, such as water, may be used to accomplish heat transfer with the refrigerant in heat exchanger 24.

Port 3 of reversing valve 25 communicates via refrigerant conduit section 91 with both service connection 27 of outdoor unit 20 and suction port 21b of compressor 21 within outdoor unit 20. While the use of service connection 27 to provide a path for communication between reservoir 64 and suction port 21b of compressor 21 is convenient and allows existing heat pump systems having such service connections to be easily retrofit with water heating modules such as module 60, communication between reservoir 64 and suction port 21b of compressor 21 can otherwise be accomplished by tapping into any section of refrigerant conduit which communicates directly to compressor suction.

Modes Of Operation

Figure 1:
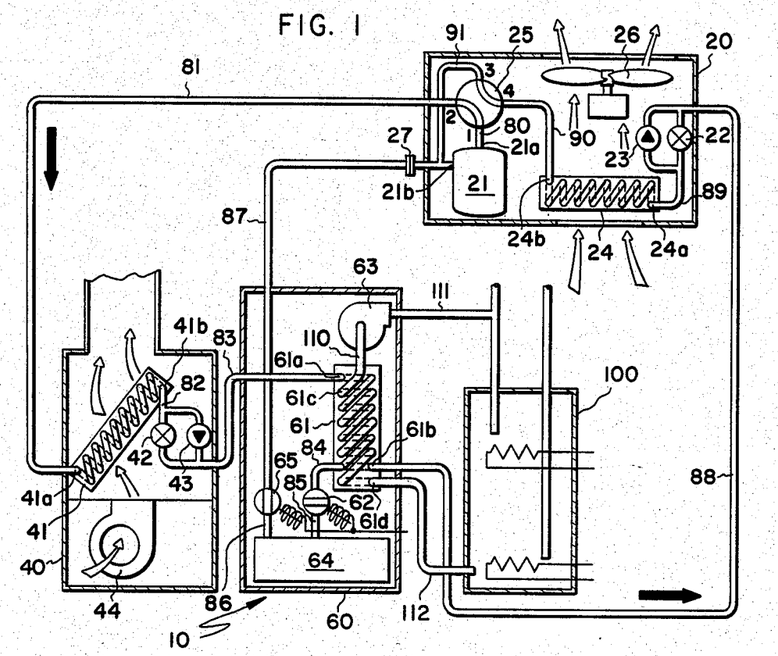
FIG. 1 is an illustration of the circuit in the space heating mode of operation as it might appear in an actual installation.

Referring exclusively now to FIG. 1, it will be seen that in a space heating mode refrigerant vapor at discharge pressure exits compressor 21, passes through conduit section 80 and enters port 1 of reversing valve 25. Reversing valve 25 is in a first position in which a flow path is provided between ports 1 and 2 and between ports 3 and 4. Thus, refrigerant vapor passes through reversing valve 25 exits the valve at port 2 and enters conduit section 81. The vapor is thence communicated to heat exchanger 41 in indoor unit 40 where it condenses and gives up heat to the air being blown through heat exchanger 41 by blower 44 which is activated. Condensed refrigerant exits heat exchanger 41 and is directed through check valve 43, thermal expansion valve 42 being by-passed in this mode of operation. Condensed refrigerant then enters heat exchanger 61 after passing through refrigerant conduit section 83. Solenoid operated refrigerant valve 62 within water heating module is closed in the space heating mode of operation with the result that all of the refrigerant exiting heat exchanger 41 passes directly through heat exchanger 61. In that pump 63 is inactivated in the space heating mode, condensed refrigerant passes through heat exchanger 61 substantially unaffected, is directed through conduit section 88 and is metered through thermal expansion valve 22 to heat exchanger 24. Fan 26 is activated to cause outside air to pass through heat exchanger 24 in a heat exchange relationship with the refrigerant passing therethrough. As a result, the refrigerant vaporizes within heat exchanger 24 and enters refrigerant conduit section 90 as a vapor. Refrigerant vapor then flows through port 4 of reversing valve 25, exiting the valve through port 3, and enters refrigerant conduit section 91 where it is directed to suction port 21b of compressor 21. Solenoid operated refrigerant valve 65 is open in the space heating mode of operation and provides, along with refrigerant conduit sections 86 and 87 a refrigerant flow path between refrigerant charge reservoir 64 and suction port 21b of compressor 21. As noted above, refrigerant valve 62 is closed, the result being that any refrigerant deposited in reservoir 64 from an earlier mode of operation will be vaporized and utilized by the circuit in the space heating mode.

Figure 2:
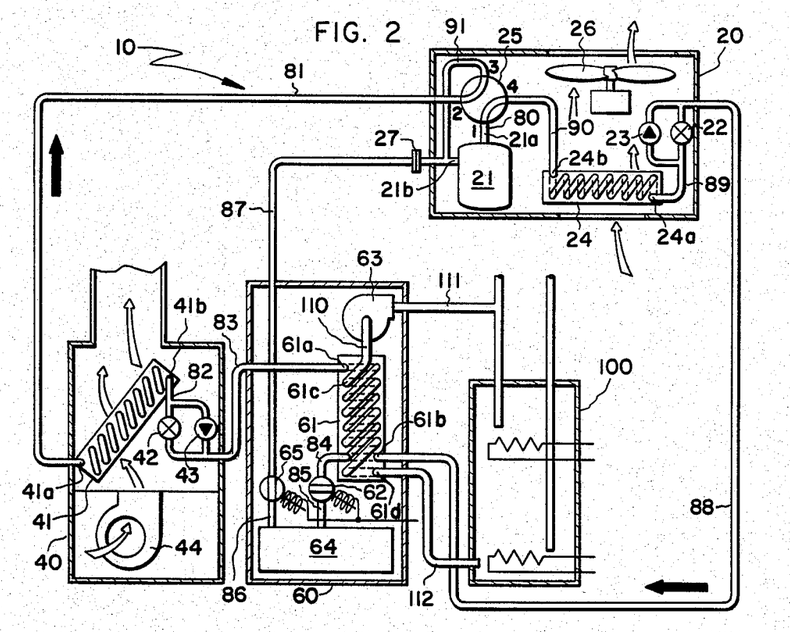
FIG. 2 is an illustration of the circuit in the space cooling mode of operation as it might appear in an actual installation.

Referring now exclusively to FIG. 2, the space cooling mode of the invention will be appreciated. Refrigerant vapor exits compressor discharge port 21a and enters port 1 of reversing valve 25 after passing through conduit section 80. Reversing valve 25 is in a second position as compared with its position in the space heating mode of operation. In the space cooling mode refrigerant vapor entering port 1 of reversing valve 25 is directed out of valve 25 through port 4 and conduit section 90 to heat exchanger 24 in outdoor unit 20. Fan 26 is activated causing outside air to pass through heat exchanger 24 in a heat exchange relationship with the refrigerant passing therethrough. The refrigerant vapor received from compressor 21 is condensed within heat exchanger 24 giving up heat to the outside air. The condensed refrigerant exits heat exchanger 24 and is directed through refrigerant conduit section 89, check valve 23 and refrigerant conduit section 88 to liquid heating module 60. Thermal expansion valve 22 is bypassed in this mode of operation. The condensed refrigerant enters refrigerant-liquid heat exchanger 61 which is inactive as in the space heating mode. Condensed refrigerant passes through heat exchanger 61 unaffected, through conduit section 83 and is directed to thermal expansion valve 42 within indoor heat exchange unit 40. After being metered through thermal expansion valve 42 and passing through refrigerant conduit section 82 the refrigerant enters heat exchanger 41 where it removes heat from and is vaporized by heat transfer with air passing through heat exchanger 41 under the impetus of blower 44. Refrigerant vapor exits heat exchanger 41 and indoor heat exchange unit 40 to be returned, via conduit section 81, to port 2 of reversing valve 25 in outdoor heat exchange unit 20. The vapor is then conducted through valve 25, out of port 3 therein and is communicated through conduit section 91 to suction port 21b of compressor 21. As in the space heating mode of operation solenoid operated refrigerant valve 65 is open while solenoid operated refrigerant valve 62 is closed. Any refrigerant previously deposited in charge reservoir 64 as a result of earlier circuit operation in a liquid heating mode is vaporized, enters the suction port of compressor 21 and is utilized within the circuit after passing through conduit section 86, refrigerant valve 65, conduit section 87 and service connection 27.

Figure 3:
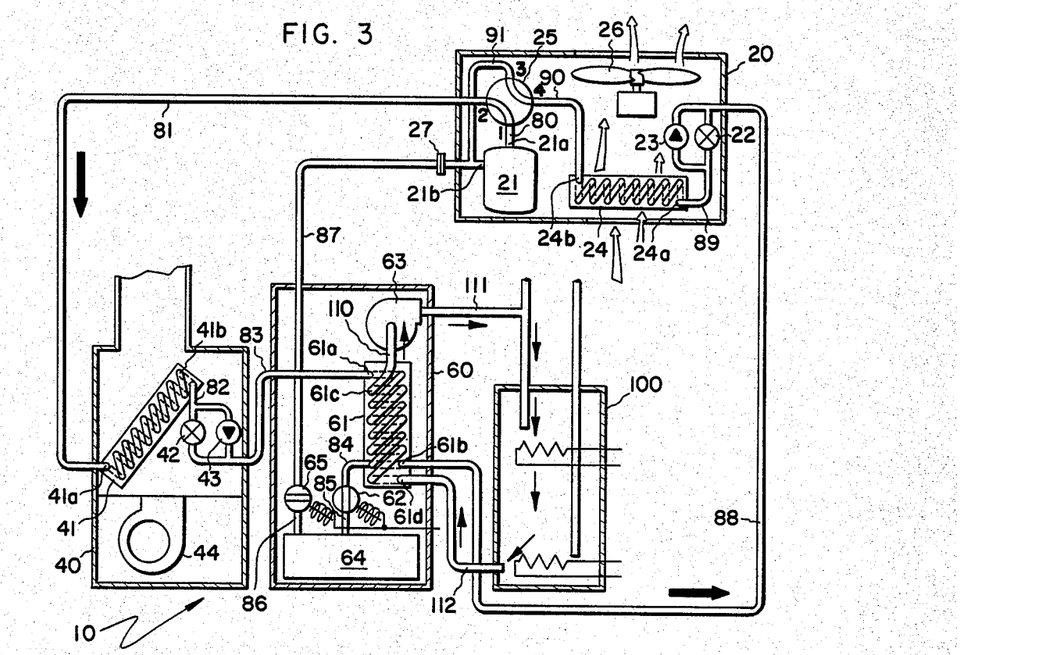
FIG. 3 is an illustration of the circuit in the liquid heating mode of operation as it might appear in an actual installation.

The liquid heating mode of circuit operation will become evident when FIG. 3 is examined. Refrigerant exiting compressor 21 is directed via conduit section 80 to port 1 of reversing valve 25. Reversing valve 25, being in the same position as described in the space heating mode, conducts the refrigerant vapor to and out of port 2 and into conduit section 81 leading to heat exchanger 41 within indoor heat exchange unit 40. Fan 44 is off and heat exchanger 41 is inactive in this mode of operation. Refrigerant vapor therefore passes substantially unaffected into conduit section 82, through check valve 43, bypassing thermal expansion valve 42, and into conduit section 83. The refrigerant exits conduit section 83 and enters heat exchanger 61 within liquid heating module 60. In the liquid heating mode of operation pump 63 is running. The liquid to be heated is pumped from liquid storage tank 100 through liquid conduit 112 and into refrigerant-liquid heat exchanger 61 where it is heated. The heated liquid is then returned via liquid conduit 110, pump 63 and liquid conduit 111 to storage tank 100. In the process of giving up heat to the liquid being circulated through heat exchanger 61 refrigerant vapor within the circuit is condensed before passing into conduit section 88 which connects water heating module 60 with outdoor heat exchange unit 20. The condensed refrigerant is then metered into heat exchanger 24 through conduit section 89 by thermal expansion valve 22 within outdoor unit 20. Refrigerant metered into active heat exchanger 24 is vaporized therein and is returned to suction port 21b of compressor 21 after passing through conduit section 90, ports 4 and 3 of reversing valve 25 and conduit section 91.

As earlier mentioned, excess liquid refrigerant will exist in the circuit in both the liquid heating and the simultaneous space cooling and liquid heating modes of operation. This excess refrigerant must be accommodated within the circuit in order to optimize the exchange of heat when the circuit is in one of the two aforementioned modes. Excess refrigerant exists within the circuit in the two liquid heating modes in part because either the indoor or outdoor heat exchange unit is inactive depending upon which of the two liquid heating modes is selected. The inactive unit in each of the liquid heating modes receives refrigerant vapor directly from the system compressor. The vapor passes through the inactive unit substantially unaffected. Thus, instead of containing a combination of liquid and vapor as it would in a non-liquid heating mode, the inactive heat exchange unit contains only vapor when a liquid is being heated. Further, in the two non-liquid heating modes of operation the refrigerant-liquid heat exchanger is inactive and is flooded with liquid refrigerant whereas in the two liquid heating modes of operation the refrigerant-liquid heat exchanger is active and contains refrigerant both in the liquid and vapor states. It is the portion of liquid refrigerant which is effectively displaced from the inactive heat exchanger and from the active refrigerant-liquid heat exchanger in the liquid heating modes which becomes excess and must be accommodated in order to control the refrigerant charge within the system in the liquid heating modes of operation. To this end, refrigerant charge reservoir 64 is provided.

Refrigerant charge reservoir 64 communicates with heat exchanger 61 by means of conduit section 85, solenoid operated refrigerant valve 62 and conduit section 84. Charge reservoir 64 is disposed within liquid heating module 60 at an appropriate elevation with respect to heat exchanger 61 to receive liquid refrigerant from heat exchanger 61 by gravity feed. Accordingly, conduit section 84 is shown connected to the lowest point of heat exchanger 61 such that liquid refrigerant will drain into reservoir 64 when valve 62 is open. Alternatively, conduit section 84 can connect into a portion of the refrigerant liquid line, other than the refrigerant flow path within heat exchanger 61, if provision is made to ensure that refrigerant exists only in the liquid state at the point of connection irrespective of the mode in which the circuit is operating. Such provision is later described. It is to be remembered that in both of the liquid heating modes valve 62 is open and that in all instances when valve 62 is open, valve 65 is closed.

In both of the liquid heating modes reservoir 64 fills with liquid refrigerant draining out of heat exchanger 61. The removal of liquid refrigerant from the circuit by the filling of reservoir 64 accomplishes refrigerant charge control within the circuit. It should be apparent that the capacity of reservoir 64 is determinative of the amount of refrigerant within the circuit when a liquid is to be heated. The capacity of charge reservoir 64 is predetermined in accordance with the size of the heat exchangers within the circuit through which refrigerant passes such that a predetermined amount of refrigerant remains in the circuit after charge reservoir 64 fills. Emphasis is placed on optimizing the capacity of charge reservoir 64 and therefore on optimizing refrigerant charge control within the circuit to provide maximum space cooling efficiency in the simultaneous space cooling and liquid heating mode of operation since the primary function of the circuit is to condition a space. The liquid heating aspects of the two liquid heating modes are accorded secondary consideration in determining the capacity of charge reservoir 64. Charge reservoir 64 thus facilitates refrigerant charge control in an expedient and practical fashion.

Figure 4:
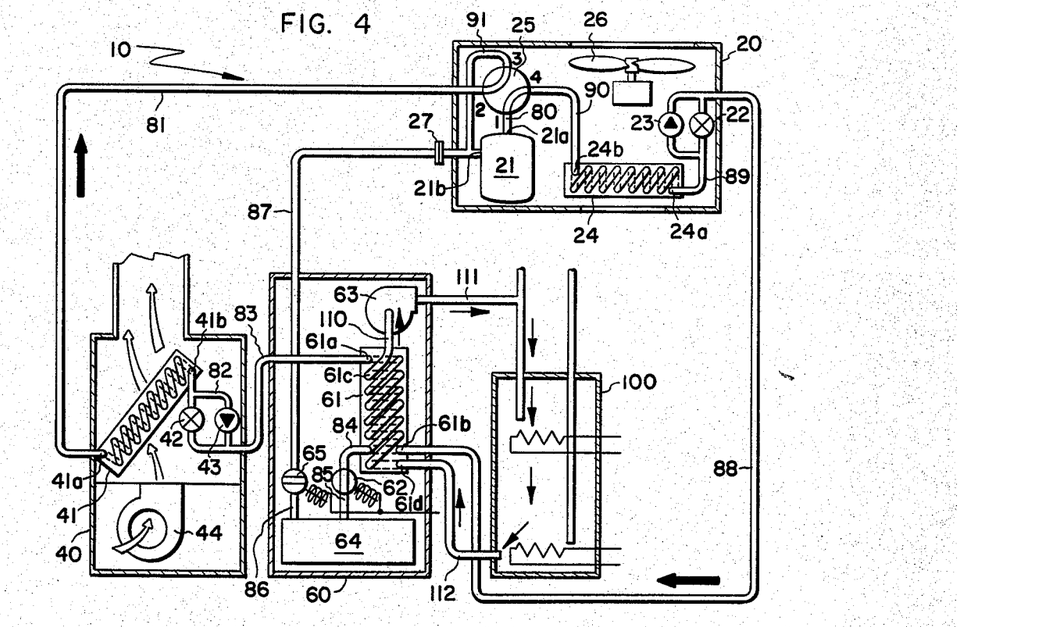
FIG. 4 is an illustration of the circuit in the simultaneous space cooling and liquid heating mode of operation as it might appear in an actual installation.

The simultaneous space cooling and liquid heating mode of circuit operation can now be better appreciated and is illustrated in FIG. 4. Refrigerant vapor at discharge pressure exits compressor 21, passes through conduit section 80 and enters port 1 of reversing valve 25. Reversing valve 25 is in its second position, the position in which it is found in the space cooling mode of operation. Refrigerant vapor exits port 4 of valve 25 and enters conduit section 90. The refrigerant vapor next passes through inactive heat exchanger 24, fan 26 being off in this mode of operation. Vapor passes through check valve 23, bypassing thermal expansion valve 22, and enters conduit section 88 before entering heat exchanger 61 in module 60. Liquid being circulated through heat exchanger 61 by pump 63 condenses the refrigerant vapor passing through heat exchanger 61. Condensed refrigerant, after filling charge reservoir 64, passes through conduit section 83, is metered through thermal expansion valve 42 and enters conduit section 82. The refrigerant next enters heat exchanger 41 where it is vaporized in the process of removing heat from air passing through heat exchanger 41 under the impetus of blower 44. The resulting refrigerant vapor is returned to suction port 21b of compressor 21 via conduit section 81, the flow path between ports 2 and 3 of valve 25 and conduit section 91. To reiterate, when a non-liquid heating mode is selected after a liquid heating mode has occurred valve 62 closes and valve 65 opens simultaneously and liquid refrigerant contained within reservoir 64 vaporizes and is drawn into suction port 21b of compressor 21. In this manner refrigerant is returned to the circuit for use and proper refrigerant charge control is accomplished for the non-liquid heating modes of operation.

Figure 5:
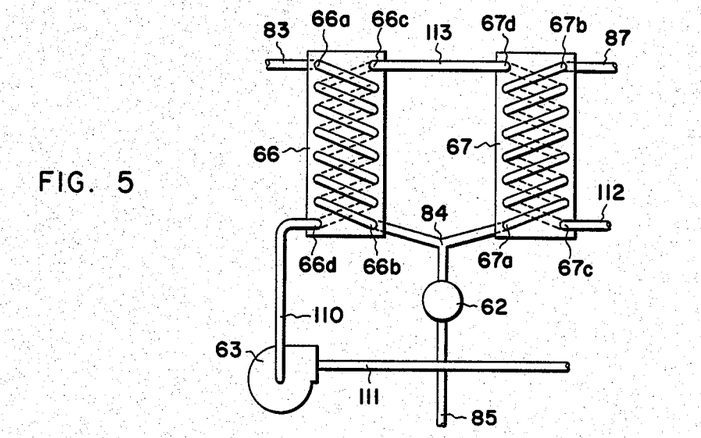
FIGS. 5, 6 and 7 illustrates an alternative embodiment for a part of the water heating module portion of the circuit disclosed herein.

It is here opportune to call attention to FIG. 5 which demonstrates a second manner in which gravity feed of liquid refrigerant to refrigerant charge reservoir 64 can be accomplished. In FIG. 5 conduit section 84 is formed in a "Y" shape and is disposed between a first half-size heat exchanger 66 and a second half-sized heat exchanger 67. The reference to half-sized heat exchangers indicates that the two heat exchangers utilized are of such a size that their combined heat exchange capability equals the heat exchange capability of the single refrigerant-liquid heat exchanger in the circuit as previously described. An additional length of conduit section 113 would be required to provide a path for the liquid to be heated between the two half-size heat exchange units. This embodiment, in some cases, might be preferable from a practical standpoint as it involves only the utilization of slightly greater lengths of liquid and refrigerant conduit and does not involve tapping directly into a heat exchanger coil. It will be recognized though that two smaller as opposed to a single larger heat exchanger would be required. If two half-size heat exchangers are employed, the refrigerant path between refrigerant conduit sections 83 and 87 would be from conduit section 83 through flow connection 66a, through first half-size heat exchanger 66, out of flow connection 66b and into refrigerant conduit section 84. The refrigerant flow path would then continue out of conduit section 84 into flow connection 67a, through second half-size heat exchanger 67, out of flow connection 67b and into refrigerant conduit section 87. The liquid to be heated will flow between liquid conduit sections 112 and 110 by entering second half-size heat exchanger 67 at flow connection 67c, passing through and exiting heat exchanger 67 at flow connection 67d and entering liquid conduit section 113. The liquid will then enter half-size heat exchanger 66 at flow connection 66c, exit the heat exchanger at flow connection 66d and enter liquid conduit section 110.

Figure 6:
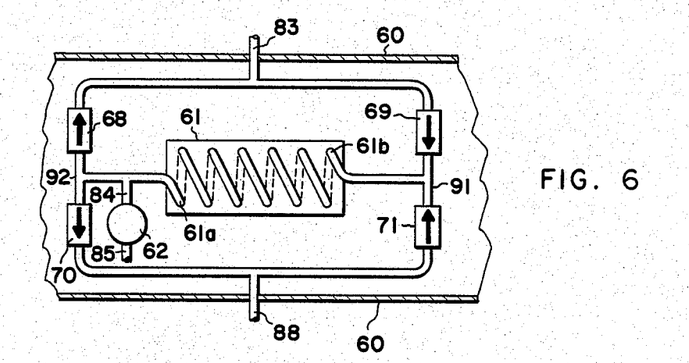
Figure 7:
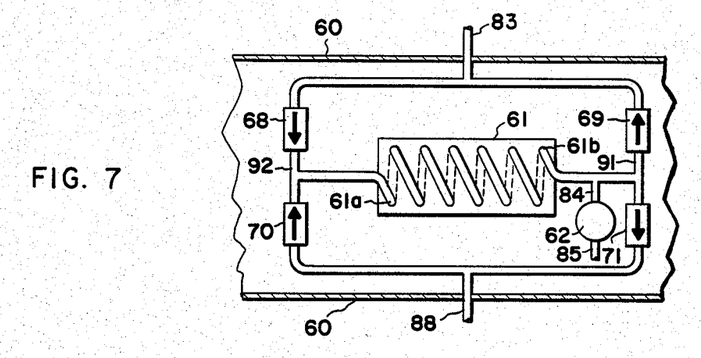

As earlier mentioned, and as an alternative to the embodiment of FIG. 5, provision can be made for conduit section 84 to tap into a section of the refrigerant liquid line other than the refrigerant flow path within heat exchanger 61. This section must contain only liquid refrigerant irrespective of the mode of circuit operation. In order to provide such a continuously flooded portion of refrigerant conduit, the use of four check valves and modification of the refrigerant conduit within liquid heating module 60 is required. Referring to FIGS. 6 and 7, it is seen that conduit section 83 forks within module 60 and terminates at a first check valve 68 and at a second check valve 69. Similarly, conduit section 88 forks within module 60 and terminates at a third check valve 70 and at a fourth check valve 71. Additional refrigerant conduit sections 91 and 92, which in the embodiments of FIGS. 6 and 7 are part of the refrigerant liquid line, connect check valves 68, 69, 70 and 71 with heat exchanger 61 and with conduit section 84 as illustrated. In the embodiments of FIGS. 6 and 7 refrigerant flow within liquid heating module 60 is directed in a manner such that irrespective of whether refrigerant is received from outdoor unit 20 or indoor unit 40, and irrespective of the state in which it is received, refrigerant is constrained to pass through heat exchanger 61 in only one direction and exists, as discharged from heat exchanger 61, only in the liquid state.

Referring to FIGS. 1 through 4 and FIG. 6, in the space heating mode refrigerant is received from indoor unit 40 through conduit 83 as a liquid. The liquid passes through check valve 69, into conduit section 91, through inactive heat exchanger 61, and into conduit section 92. It next passes through check valve 70 and into conduit section 88. In the space cooling mode liquid refrigerant is received from outdoor unit 20 via conduit 88, passes through check valve 71, through conduit section 91 and inactive heat exchanger 61, into conduit section 92, through check valve 68 and into conduit section 83. In the liquid heating mode refrigerant vapor passes through check valve 69 after travelling through conduit section 83. The vapor next passes through conduit section 91, through active heat exchanger 61, where it is condensed, through conduit section 92, through check valve 70, and into conduit section 88. In the simultaneous space cooling and liquid heating mode refrigerant vapor is received from outdoor unit 20 via conduit section 88 and passes through check valve 71 into conduit section 91. The refrigerant is condensed in active heat exchanger 61, passes into conduit section 92 as a liquid, and then passes through check valve 68 into conduit section 83. From the above descriptions it is clear that refrigerant exists in conduit section 92 only in the liquid state irrespective of the mode of circuit operation and that refrigerant can conveniently be directed from this continuously flooded section to refrigerant charge reservoir 64 whenever necessary. FIG. 7 illustrates that by reversing the flow direction of each of check valves 68, 69, 70 and 71, conduit section 91 can be made the continuously flooded portion of the refrigerant liquid line into which conduit section 84 connects. One additional advantage in utilizing the embodiments of FIGS. 6 and 7, which is not readily apparent, is that the flow directions of the liquid to be heated and the refrigerant within heat exchanger 61 can be made to be opposite in both of the water heating modes of operation by virtue of the single flow direction of refrigerant through the heat exchanger. Heat transfer between the refrigerant and the liquid to be heated is thereby enhanced.

It should be appreciated from the preceding description that the refrigeration circuit herein disclosed is a relatively uncomplicated yet versatile circuit, employing a minimum number of components while providing for four distinct modes of operation. The series placement of the heat exchangers within the circuit eliminates the need to evacuate an inactive or intermittently active heat exchanger within the circuit in order to maintain refrigerant charge control. The well-documented problems attendant with evacuating inactive or intermittently activated heat exchangers in refrigeration circuits are therefore avoided. Although it is contemplated that the typical use of the present invention will be to heat water for domestic purposes, it should be understood that other liquids are capable of being heated in the manner disclosed. Similarly, although the preferred embodiment is described in the context of an air-to-air heat pump system, it should be apparent that the heat transfer medium could be other than air. Likewise, it will be apparent that the entire system, although described in the context of a split system in the preferred embodiment can, with little difficulty, be packaged as a single unit. The circuit may obviously be constructed and installed all at one time. However, the circuit is sufficiently flexible to allow for the retrofit of the liquid heating module portion of the circuit to previously installed heat pump systems in order to increase the efficiency of the already energy-efficient heat pump circuit. No specific details of the means for controlling the valves within the circuit are believed necessary as such means are both relatively uncomplicated and large in number. Circuit control would also differ according to the specifics of a particular installation. It is likely that control features for the refrigeration circuit would be integrated with the controls for other climate control devices not directly related to the circuit herein described in order to accomplish optimal conditioning of the air and liquid within a structure. While the invention has been described above with regard to a single preferred embodiment, it must be understood that many other modifications to the circuit will be apparent to those skilled in the art and that such modifications lie within the scope of the present invention as defined in the claims which follow.

I claim:

1. A refrigeration circuit operable in a plurality of modes to accomplish space heating, space cooling, liquid heating or simultaneous space cooling and liquid heating, comprising:

a refrigerant vapor compressor, said compressor having a suction port and a discharge port;

first heat exchange means, for transferring heat between a refrigerant and air circulated within a space;

second heat exchange means, for transferring heat between a refrigerant and a heat transfer medium;

third heat exchange means for transferring heat between a refrigerant and a liquid, said third heat exchange means connected to said first heat exchange means by a first refrigerant flow path and to said second heat exchange means by a second refrigerant flow path;

a refrigerant charge reservoir;

first selectively positionable valve means, for providing a refrigerant flow path between said discharge port of said compressor and said first heat exchange means and between said second heat exchange means and said suction port of said compressor when in a first position, and a refrigerant flow path between said discharge port of said compressor and said second heat exchange means and between said first heat exchange means and said suction port of said compressor when in a second position; and second selectively positionable valve means, for providing a refrigerant flow path between said third heat exchange means and said reservoir when in a first position and a refrigerant flow path from said reservoir to said suction port of said compressor when in a second position, said second valve means blocking said flow path between said reservoir and said compressor suction port when in said first position and blocking said flow path between said third heat exchange means and said reservoir when in said second position.

2. The refrigeration circuit according to claim 1 wherein said second selectively positionable valve means comprises a first and a second solenoid operated refrigerant valve, said first valve being open when said second valve is closed and said first valve being closed when said second valve is open, said first valve providing said refrigerant flow path between said third heat exchange means and said reservoir when open and blocking the flow of refrigerant to said reservoir when closed and said second valve providing said refrigerant flow path from said reservoir to said suction port of said compressor when open and isolating said reservoir from said compressor suction port when closed.

3. The refrigeration circuit according to claim 2 wherein said refrigerant charge reservoir is disposed within said circuit to receive refrigerant by gravity feed and wherein the refrigerant charge within said circuit is controlled, in said liquid heating mode and in said simultaneous space cooling and liquid heating mode, by the capacity of said reservoir, the capacity of said reservoir being predetermined according to the size of said first, said second and said third heat exchange means to provide an optimal refrigerant charge within said circuit in said simultaneous space cooling and liquid heating mode.

4. The refrigeration circuit according to claim 3 wherein said third heat exchange means comprises:

a condenser; and a selectively activated pump, said pump, when activated, circulating a liquid to be heated through said condenser in a heat exchange relationship with refrigerant therein.

5. The refrigeration circuit according to claim 3 wherein said third heat exchange means includes a first and a second refrigerant flow connection, and wherein said circuit further comprises:

means for directing refrigerant flow into and out of said third heat exchange means and between said first and said second refrigerant flow connections in only one direction irrespective of whether said refrigerant is received from said first heat exchange means via said first refrigerant flow path or from said second heat exchange means via said second refrigerant flow path, said refrigerant directing means connecting said first solenoid operated refrigerant valve with the flow connection out of which refrigerant flows from said third heat exchange means, whereby refrigerant flowing out of said third heat exhange means is in a liquid state.

6. A liquid heating module for use in combination with a heat pump circuit used to selectively heat or cool a space, where said heat pump circuit includes a compressor, an indoor unit including a heat exchanger, and an outdoor unit including a heat exchanger, said indoor and said outdoor unit heat exchangers being connected by a refrigerant liquid line, said module comprising:
means for exchanging heat between a refrigerant and a liquid, said refrigerant-liquid heat exchange means interposed in said refrigerant liquid line to provide an uninterrupted flow path for refrigerant between said inside and said outside heat exchange units;
a refrigerant charge reservoir; and
valve means connected to said refrigerant-liquid heat exchange means, to said refrigerant charge reservoir, and to the suction port of said heat pump compressor, for selectively providing either a first refrigerant flow path or a second refrigerant flow path, said first refrigerant flow path connecting said refrigerant-liquid heat exchange means with said charge reservoir and said second refrigerant flow path connecting said reservoir with the suction port of said heat pump compressor.

7. The liquid heating module according to claim 6 further comprising means for pumping a liquid to be heated through said refrigerant-liquid heat exchange means.

8. The liquid heating module to claim 7 wherein said refrigerant charge reservoir is disposed module to receive refrigerant from said refrigerant-liquid heat means by gravity feed and wherein the refrigerant charge within said combination is controlled, when said first refrigerant flow path is provided, by the capacity of said charge reservoir, the capacity of said charge reservoir being predetermined according to the size of said indoor unit heat exchanger, said outdoor unit heat exchanger, and said refrigerant-liquid heat exchange means, the capacity of said module being further predetermined to optimize the refrigerant charge within said combination for the condition where said first flow path is provided, said outdoor unit is inactive to exchange heat and said indoor unit active to exchange heat.

9. The liquid heating module according to claim 8 wherein said valve means comprises a first and a second solenoid operated refrigerant valve, said first valve being open when said second valve is closed and said first valve being closed when said second valve is open, said first valve providing said first refrigerant flow path connecting said refrigerant-liquid heat exchange means with said charge reservoir when open and blocking the flow of refrigerant to said charge reservoir when closed, and said second valve providing said second refrigerant flow path connecting said charge reservoir with the suction port of said compressor when open and isolating said charge reservoir from the suction port of said heat pump compressor when closed.

10. The liquid heating module according to claim 9 wherein said refrigerant-liquid heat exchange means comprises:
a first refrigerant-liquid heat exchanger;
a second refrigerant-liquid heat exchanger;
conduit means connecting the liquid flow paths within said first and said second refrigerant-liquid heat exchangers to provide a single flow path for a liquid to be heated through said first and said second refrigerant-liquid heat exchangers; and
refrigerant conduit means connecting the refrigerant flow paths within said first and said second refrigerant-liquid heat exchangers to provide a single refrigerant flow path through said first and said second refrigerant-liquid heat exchangers, said refrigerant conduit means being connected via said first valve to said refrigerant charge reservoir.

11. The liquid heating module according to claim 6 wherein said means for exchanging heat between a refrigerant and a liquid comprises a condenser, said condenser having a first and a second refrigerant flow connection, and a selectively activated pump, and wherein said liquid heating module further comprises means for directing refrigerant flow into and out of said condenser and between said first and said second refrigerant flow connections in only one direction, said first refrigerant directing means connecting said first refrigerant flow path selectively provided by said valve means and the flow connection out of which refrigerant flows from said condenser, whereby refrigerant flowing out of said condenser is in a liquid state.

12. The liquid heating module according to claim 11 wherein said refrigerant charge reservoir is disposed within said module to receive refrigerant by gravity feed and wherein the refrigerant charge within said combination is controlled, when said first refrigerant flow path is provided, by the capacity of said charge reservoir, the capacity of said charge reservoir being predetermined according to the size of said indoor unit heat exchanger, said outdoor unit heat exchanger and said refrigerant-liquid heat exchange means, the capacity of said module being further predetermined to optimize the refrigerant charge within said combination for the condition where said first flow path is provided, said outdoor unit is inactive to exchange heat, and said indoor unit is active to exchange heat.

13. A refrigerant circuit comprising:
means for compressing a refrigerant vapor, said compressor means having a suction port and a discharge port;
first selectively activated heat exchange means, for transferring heat between a refrigerant and air circulated within an indoor space;
second selectively activated heat exchange means for transferring heat between a refrigerant and a heat transfer medium;
third selectively activated heat exchange means, for transferring heat between a refrigerant and a liquid;
a refrigerant charge reservoir; and
conduit means, including selectively positionable valve means, for directing the flow of refrigerant within said circuit in
i. a space heating mode wherein said charge reservoir is vented to said suction port of said compressor means and wherein said compressor discharges refrigerant to said first heat exchange means, said refrigerant thence being directed through said third heat exchange means and through said second heat exchange means and returned to said suction port of said compressor means, said first and second heat exchange means being activated and said third heat exchange means being inactivated in said space heating mode;

ii. a space cooling mode wherein said charge reservoir is vented to said suction port of said compressor means and wherein said compressor discharges refrigerant to said second heat exchange means, said refrigerant thence being directed through said third heat exchange means and through said first heat exchange means and returned to said suction port of said compressor means, said first and second heat exchange means being activated and said third heat exchange means being inactivated in said space cooling modes;

iii. a liquid heating mode wherein said compressor means discharges refrigerant to said first heat exchange means, said refrigerant thence being directed to said third heat exchange means for condensation therein, a first predetermined portion of said condensed refrigerant being directed to said refrigerant charge reservoir and a second predetermined portion of said condensed refrigerant being directed to said second heat exchange means for vaporization therein and return to said suction port of said compressor means, said second and said third heat exchange means being activated and said first heat exchange means being inactivated in said liquid heating mode;

iv. a simultaneous space cooling and liquid heating mode wherein said compressor means discharges refrigerant to said second heat exchange means, said refrigerant thence being directed to said third heat exchange means for condensation therein, a first predetermined portion of said c6ndensed refrigerant being directed to said refrigerant charge reservoir and a second predetermined portion of said condensed refrigerant being directed to said first heat exchange means for vaporization therein and return to said suction port of said compressor means, said first and said third exchange means being activated and said second heat exchange means being inactivated in said simultaneous space cooling and liquid heating mode.

14. The refrigeration circuit according to claim 13 wherein said selectively positionable valve means comprises:

a reversing valve, said reversing valve directing refrigerant from said compressor means to said first heat exchange means in said space heating and in said liquid heating modes and directing refrigerant from said compressor means to said second heat exchange means in said space cooling and in said simultaneous space cooling and liquid heating modes;

a first solenoid operated refrigerant valve, said first valve being open and providing a flow path to said reservoir for refrigerant condensed in said third heat exchange means in said liquid heating and in said simultaneous space cooling and liquid heating modes and said first valve being closed and blocking refrigerant flow to said reservoir in said space heating and space cooling modes; and a second solenoid operated refrigerant valve, said second valve being open and providing a flow path for refrigerant from said reservoir to said suction port of said compressor means in said space heating and space cooling modes and said second valve being closed and blocking refrigerant flow from said reservoir to said suction port of said compressor means in said liquid heating and simultaneous space cooling and liquid heating modes.

15. The refrigeration circuit according to claim 14 wherein said refrigerant charge reservoir is disposed within said circuit to receive refrigerant by gravity feed and wherein the refrigerant charge within said circuit is controlled, in said liquid heating mode and in said simultaneous space cooling and liquid heating mode, by the capacity of said reservoir, the capacity of said reservoir being predetermined according to the size of said first, said second and said third heat exchange means to provide an optimal refrigerant charge within said circuit in said simultaneous space cooling and liquid heating mode.

16. The refrigeration circuit according to claim 15 wherein said third heat exchange means comprises:

a condenser; and a selectively activated pump, said pump, when activated, circulating a liquid to be heated through said condenser in a heat exchange relationship with refrigerant therein.

17. The refrigeration circuit according to claim 16 wherein said condenser has a first and a second refrigerant flow connection and said circuit further comprises means for directing refrigerant flow into and out of said condenser and between said first and said second refrigerant flow connections in only one direction, said refrigerant directing means connecting said first solenoid operated refrigerant valve and the flow connection out of which refrigerant flows from said condenser, whereby refrigerant flowing out of said condenser is in a liquid state.

18. The refrigeration circuit according to claim 13 wherein said refrigerant charge reservoir is disposed within said circuit to receive refrigerant by gravity feed and wherein the refrigerant charge within said circuit is controlled, in said liquid heating mode and in said simultaneous space cooling and liquid heating mode, by the capacity of said reservoir, the capacity of said reservoir being predetermined according to the size of said first, said second and said third heat exchange means to provide an optimal refrigerant charge within said circuit in said simultaneous space cooling and liquid heating mode.

* * * * *

UNITED STATES PATENT AND TRADEMARK OFFICE
CERTIFICATE OF CORRECTION

PATENT NO. : 4,528,822

DATED : July 16, 1985

INVENTOR(S) : Paul R. Glamm

It is certified that error appears in the above-identified patent and that said Letters Patent is hereby corrected as shown below:

Column 6, line 35: "operatioh" should read --operation--

Column 13, line 37, Claim 8 should read: disposed --within said-- module

Column 13, line 50, Claim 8 should read: unit --is--active

Column 15, line 36, Claim 13; "c6ndensed" should read --condensed--

Signed and Sealed this

Thirty-first Day of December 1985

[SEAL]

Attest:

DONALD J. QUIGG

Attesting Officer

Commissioner of Patents and Trademarks